(12) United States Patent
Ugur et al.

(10) Patent No.: US 8,594,203 B2
(45) Date of Patent: Nov. 26, 2013

(54) SYSTEM AND METHOD FOR USING PARALLELLY DECODABLE SLICES FOR MULTI-VIEW VIDEO CODING

(75) Inventors: Kemal Ugur, Tampere (FI); Jani Lainema, Tampere (FI); Miska Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 1108 days.

(21) Appl. No.: 11/872,650

(22) Filed: Oct. 15, 2007

(65) Prior Publication Data
US 2008/0089412 A1 Apr. 17, 2008

Related U.S. Application Data

(60) Provisional application No. 60/852,029, filed on Oct. 16, 2006.

(51) Int. Cl.
  *H04N 7/12* (2006.01)
  *H04N 11/02* (2006.01)
  *H04N 11/04* (2006.01)

(52) U.S. Cl.
  USPC ............ 375/240.25; 375/240.12; 375/240.13; 348/42; 348/47; 348/48; 348/394.1; 382/233; 382/234; 382/328

(58) Field of Classification Search
  USPC ........ 375/240.01–240.29; 348/43, 48, 42, 47, 348/394.1; 382/233–236, 238
  See application file for complete search history.

(56) References Cited

U.S. PATENT DOCUMENTS

| | | | | |
|---|---|---|---|---|
| 5,612,735 A | * | 3/1997 | Haskell et al. | 348/43 |
| 6,055,012 A | * | 4/2000 | Haskell et al. | 348/48 |
| 2005/0207497 A1 | * | 9/2005 | Rovati et al. | 375/240.16 |
| 2007/0189396 A1 | * | 8/2007 | Kitahara et al. | 375/240.26 |

FOREIGN PATENT DOCUMENTS

| | | |
|---|---|---|
| EP | 1 578 131 A1 | 9/2005 |
| EP | 1578131 | 9/2005 |
| EP | 1835747 | 9/2007 |
| WO | WO 2006/073116 | 7/2006 |
| WO | WO 2006/073116 A1 | 7/2006 |

OTHER PUBLICATIONS

A Hybrid Motion-Vector Coding Sheme Based on an Estimation of the Locality for Motion-Vector Difference, IEEE, Yong Ho Moon et al., Jun. 6, 2006.*
English Translation of Office Action for Korean Application No. 2009-7009917 dated. Oct. 21, 2010.
English Translation of Office Action for Chinese Application No. 200780044505.6 dated Nov. 29, 2010.

(Continued)

*Primary Examiner* — Sath V Perungavoor
*Assistant Examiner* — Nathnael Aynalem
(74) *Attorney, Agent, or Firm* — Alston & Bird LLP

(57) ABSTRACT

A system and method for enabling parallel decoder implementation for different views, even when there are existing dependencies between views. In various embodiments of the present invention, information is signaled to a decoder that slices are coded using certain constraints, so that parallel decoding of slices is possible. This signaling can be performed at a sequence parameter set level, or it could be performed at picture parameter set level, slice header level or macroblock header level. Additionally, the delay between various views is also signaled to the decoder, at the same location as the constraint information in various embodiments. Various algorithms can also be used to improve the coding efficiency of the system.

25 Claims, 12 Drawing Sheets

(56) References Cited

OTHER PUBLICATIONS

Wiegand et al., Overview of the H.264/AVC video cooling standard. IEEE Transactions on Circuits and Systems for Video Technology, 13(7): 560-578, 2003.
International Search Report for PCT Application No. PCT/IB2007/054197.
Canadian Office Action from Canadian Application No. 2,673,494, dated Nov. 28, 2011.
Wiegand, et al.; "Overview of the H.264/AVC video coding standard"; IEEE Transactions on Circuits and Systems for Video Technology; 13, pp. 560-576, Jul. 2003.
Office Action for Mexican Patent Application No. MX/a/2009/003968, dated Aug. 24, 2011.
English translation of Office Action for Mexican Patent Application No. MX/a/2009/003968, dated Aug. 24, 2011.
Office Action for Chinese Patent Application No. 200780044505.6, dated Aug. 24, 2011.
English translation of Office Action for Chinese Patent Application No. 200780044505.6, dated Aug. 24, 2011.
Office Action for Mexican Application No. MX/a/2009/003968 dated Mar. 23, 2012.
European Patent Office, Extended European Search Report for Application No. 07849071.1, dated Oct. 2, 2012, 13 pages, The Netherlands.
Vetro, Anthony, et al., "*Joint Multiview Video Model (JMVM) 1.0*," 20$^{th}$ Meeting of the Joint Video Team of ISO/IEC MPEG & ITU-T VCEG (ISO/IEC JTC1/SC29/WG11 and ITU-T SG16 Q.6), Klagenfurt, Austria, Jul. 15-21, 2006, pp. 1-23, JVT-T208, Austria.
Merkle, P., et al., "*Efficient Compression of Multi-View Video Exploiting Inter-View Dependencies Based on H.264/MPEG4-AVC*," 2006 IEEE International Conference on Multimedia and Expo (ICME 2006), Toronto, Canada, Jul. 1, 2006, pp. 1717-1720, IEEE, USA.
Motion Picture Expert Group, "*International Organisation for Standardisation, Organisation Internationale de Noralisation, ISO/IEC JTC1/SC29/WG11, Coding of Moving Pictures and Audio, Requirements on Multi-View Video Coding v. 7*," MPEG Meeting in Klagenfurt, Austria, Jul. 17-21, 2006; 5 pages, ISO/IEC JTC1/SC29/WG11 N8218, Austria.
Wang, Ye-Kui, et al., "*Motion-Constrained Slice Group Indicator*", 5$^{th}$ Meeting of the Joint Video Team of ISO/IEC MPEG & ITU-T VCEG, ISO/IEC JTC1/SC29/WG11 and ITU-T SG.16 Q.6, Geneva, CH, Oct. 9-17, 2002; pp. 1-7, No. JVT-E129, Switzerland.
Kasezawa, Tadashi, et al., "*Video Buffer Models of Image Division Coding*," May 1996, pp. 221-228, vol. 42, No. 2, IEEE, USA.
Kimata, Hideaki, et al., "*System Design of Free Viewpoint Video Communication*," The Fourth International Conference on Computer and Information Technology (CIT'04), Los Alamitos, CA, Sep. 14, 2004, pp. 52-59, IEEE, USA.
Nakamura, Hiroya, et al., "MVC High-Level Syntax for Parallel Processing," 21$^{st}$ Joint Video Team Meeting of ISO/IEC MPEG & ITU-T VCEG, ISO/IEC JTC1/SC29/WG11 and ITU-T SG.16 Q6, Hangzhou, CN, Oct. 20-27, 2006, 8 pages, No. JVT-U060, China.
Ugur, Kemal, et al., "*On Parallel Encoding/Decoding of MVC*," 21$^{st}$ Meeting of the Joint Video Team of ISO/IEC MPEG & ITU-T VCEG, ISO/IEC JTC1/SC29/WG11 and ITU-T SG16, Q.6, Hangzhou, CN, Oct. 20-27, 2006, 13 pages, No. JVT-U068, China.
Liu, Hui, et al., "*On Parallel Decoding Information SEI Message*," 24$^{th}$ Meeting of the Joint Video Team of ISO/IEC MPEG & ITU-T VCEG, ISO/IEC JTC1/SC29/WG11 and ITU-T SG16 Q6, Geneva, CH, Jun. 29-Jul. 5, 2007; 7 pages, No. JVT-X058, Switzerland.
Li, Eric Q., et al., "*Implementation of H.264 Encoder on General-Purpose Processors with Hyper-Threading Technology*," Proceedings of SPIE-IS&T Electronic Imaging, Jan. 20, 2004, pp. 384-395, SPIE and IS&T, USA.
Nakagawa, Akira, et al., "*Context-Based Motion Vector Coding with 2-Dimensional VLC*," 3$^{rd}$ Meeting of the Joint Video Team of ISO/IEC MPEG & ITU-T VCEG, ISO/IEC JTC1/SC29/WG11 and ITU SG16 Q.6, Fairfax, VA, May 6-10, 2002, 10 pages, USA.
Weigand, Thomas, et al., "*Draft ITU-T Recommendation and Final Draft International Standard of Joint Video Specification (ITU-T Rec. H.264 | ISO/IEC 14496-10 AVC)*," 8$^{th}$ Meeting of the Joint Video Team of ISO/IEC MPEG & ITU-T VCEG, ISO/IEC JTC1/SC29/WG11 and ITU-T SG16 Q.6, May 23-27, 2003, Geneva, Switzerland, pp. i-253, No. JVT-G050rl, Switzerland.
Third Office Action for corresponding Chinese patent application No. 200780044505.6, dated May 25, 2012.
Canadian Intellectual Property Office, Examiner Requisition for Application No. 2,673,494, dated Mar. 22, 2013, 2 pages, Canada.
The State Intellectual Property Office of the P.R.C., Notification of Fourth Office Action for Application No. 200780044505.6, dated Apr. 11, 2013, 23 pages, China.
Office Action for European Application No. 07 849 071 dated Jul. 31, 2013.

* cited by examiner

View-0

Best Match for this block in other views is unavailable

SYSTEM AND METHOD FOR USING PARALLELLY DECODABLE SLICES FOR MULTI-VIEW VIDEO CODING

CROSS-REFERENCE TO RELATED APPLICATIONS

The present application claims priority to U.S. Provisional Patent Application No. 60/852,029, filed Oct. 16, 2006.

FIELD OF THE INVENTION

The present invention relates generally to multi-view video coding and decoding. More particularly, the present invention relates to the implementation of parallel decoder implementation for different views in multi-view systems, even when dependencies exist between views.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

With recent advances in video capture and display technologies, three-dimensional (3D) video communication and entertainment services are quickly becoming a reality and will enter into consumer domain in the near future. 3D video communication and entertainment services will likely revolutionize the way users enjoy and interact with content and will open the door for many new and exciting services. Such services may include stereoscopic video broadcasting, 3D-TV, and a wide variety of others.

3D-TV applications require special 3D displays whose characteristics can vary. For example, if a 3D display is auto-stereoscopic, then users do not need to wear any special lenses or glasses to see different views for each eye. Moreover, a 3D display could support several views to be displayed simultaneously so that user can see different views depending on the user's location with respect to the screen. This feature is referred to as head motion-parallax and is characterized as one of the most real and immersive experience available for users.

In order to enable these types of applications, new paradigms are required for the representation, transmission and rendering of 3D-video content, which could be very different from typical 2D-video use-cases. Recently, the Joint Video Team (JVT) of the ITU-T/VCEG and ISO/MPEG standardization groups undertook the effort for a Multi-View Video Coding (MVC) standard. MVC is an encoding framework of multi-view sequences which is produced either by a camera system comprising multiple cameras capturing the same event from different locations or by a single capable of capturing a 3D scene. In applications exploiting MVC, the user can enjoy real and immersive experiences, as the multi-view video represents a three dimensional scene in real space. The principle difference between a MVC coder and a traditional 2D-video coder is that MVC exploits inter-view redundancy, in addition to temporal and spatial redundancies. Therefore, in multi-view video coding structures, inter-view dependencies exist between pictures.

Unfortunately, inter-view dependencies between pictures pose serious complexity problems and parallelism issues to a video system. These issues occur because two pictures at different views need to be decoded sequentially. This is especially problematic for 3D-TV use-cases, where many views need to be displayed simultaneously. To understand these issues, it is helpful to consider a 3D-TV system that is simultaneously displaying two views, and where views are coded using the coding structure illustrated in FIG. 1. In order to decode a picture in "View-1" at any temporal instant, the picture in "View-0" at the same temporal instant should be decoded first. With this structure, the only way to display two views at the same time is to therefore have the decoder running two times faster than a regular video decoder. Even though two independent decoders running on different platforms might be available, both decoders need to run twice as fast as a regular 2D video decoder. The situation gets worse as the number of views supported by the 3D display increases. Currently, there are commercial displays which can display 100 views simultaneously, and if all of the views depend on each other, then the decoder must run 100 times faster.

In light of the above, it is clear that parallel decoding of separate views is a crucial requirement for 3D-TV systems. One solution for increasing the parallelism is to code each view independently. However, it has been learned that this kind of simulcasting approach results in a significant penalty in coding efficiency which is not desirable.

It would therefore be desirable to develop a system and method for improving the parallel decoding of separate views for 3D-TV systems and other systems while not suffering from the coding efficiency issues described above.

SUMMARY OF THE INVENTION

Various embodiments of the present invention provide a system and method for enabling parallel decoder implementation for different views, even with existing dependencies between views. This is achieved by encoding views with certain constraints so that any macroblock in a certain view is allowed to depend only on reconstruction values of a subset of macroblocks in other views. The encoding constraints that include information about which MBs that could be referenced in another view are known both by encoder and decoder, either because the constraints are pre-defined or signaled in the bitstream. The macroblock delay between two views can also be signaled to the decoder. The delay can be signaled at the same time as the other constraint information. With this information, the decoding of macroblocks in different views can happen simultaneously, as they are not referencing each other. If an encoder signals the encoding constraints, certain trade-offs between coding efficiency, parallelism and complexity can be realized. With the embodiments of the present inventions, encoders and decoders for different views can run in parallel so that the delay involved in outputting pictures is reduced.

Various embodiments also provide for more efficient entropy coders for coding the motion vectors among views using the parallelly decodable slice (PDS) concept discussed herein. This is accomplished taking advantage of the fact that (1) motion vectors in a PDS arrangement cannot take all possible values due to the restriction of the reference area, and (2) the statistical properties of horizontal and vertical components of motion vectors are inter-related in PDS.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Various embodiments of the present invention provide a system and method for enabling parallel decoder implementation for different views, even with existing dependencies between views. This is achieved by encoding views with certain constraints so that any macroblock in a certain view is allowed to depend only on reconstruction values of a subset of macroblocks in other views. The encoding constraints that include information about which MBs that could be referenced in another view are known both by encoder and decoder, either because the constraints are pre-defined or signaled in the bitstream. With this information, the decoding of macroblocks in different views can happen simultaneously, as they are not referencing each other. If an encoder signals the encoding constraints, certain trade-offs between coding efficiency, parallelism and complexity can be realized.

Figure 1:
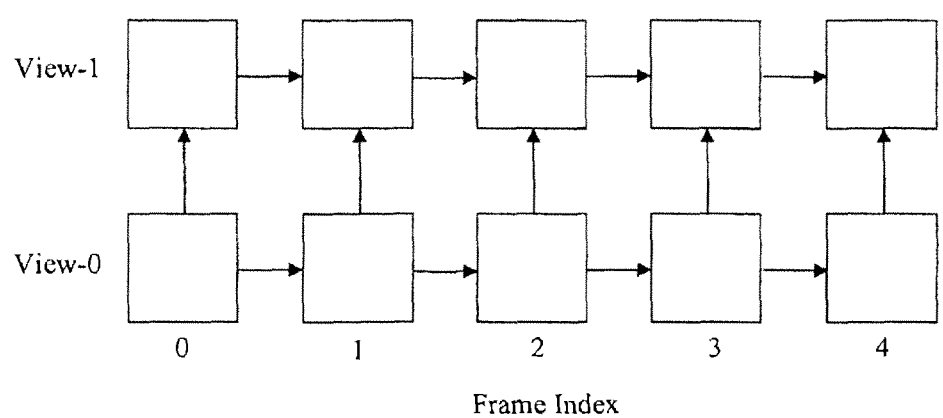
FIG. 1 is a representation of a conventional sample prediction chain for two views of a picture in a 3D-TV use case.
Figure 2:
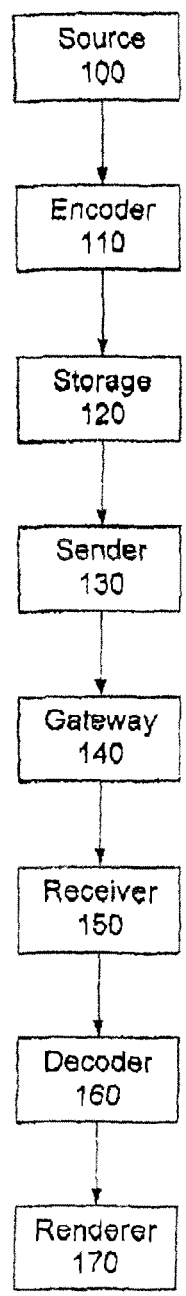
FIG. 2 is an overview diagram of a system within which various embodiments of the present invention may be implemented.

FIG. 2 shows a generic multimedia communications system for use with the present invention. It should be noted that, as discussed herein, a bitstream to be decoded can be received from a remote device located within virtually any type of network. Additionally, the bitstream can be received from local hardware or software. It should also be understood that, although text and examples contained herein may specifically describe an encoding process, one skilled in the art would readily understand that the same concepts and principles may also apply to the corresponding decoding process and vice versa.

As shown in FIG. 2, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

The system includes one or more receivers 150, typically capable of receiving, de-modulating, and de-capsulating the transmitted signal into a coded media bitstream. The coded media bitstream is typically processed further by a decoder 160, whose output is one or more uncompressed media streams. Finally, a renderer 170 may reproduce the uncompressed media streams with a loudspeaker or a display, for example. The receiver 150, decoder 160, and renderer 170 may reside in the same physical device or they may be included in separate devices.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like. The communication devices may be located in a mode of transportation including, but not limited to, an automobile, a truck, a taxi, a bus, a boat, an airplane, a bicycle, a motorcycle, etc.

Figure 3:
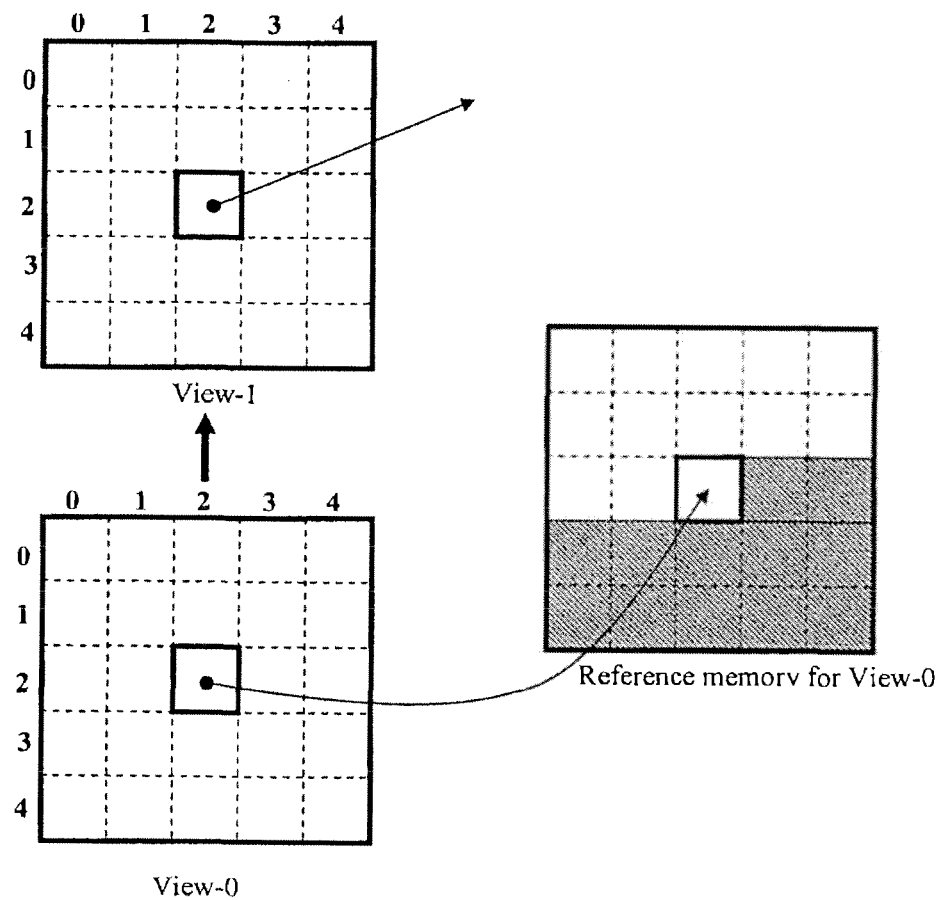
FIG. 3 is a representation showing how an embodiment of the present invention is implemented, with a one macroblock delay between two views.

For the implementation of various embodiments of the present invention, it is helpful to consider the representation depicted in FIG. 3. In FIG. 3, two frames in View-0 and View-1 are going to be decoded, and View-1 uses View-0 frame as a reference. Conventionally, the decoding of View-1 could start only after the decoding of View-0 has been completed and its reconstruction is available. If the decoding time for View-0 and View-1 are $\tau_0$ and $\tau_1$ respectively, then the total decoding time would be $\tau_0+\tau_1$ because of the sequential process, even if the resources exist to have two decoders.

Parallel decoding of views is achieved by limiting the reference area that each macroblock in View-1 can use. In this example, macroblocks in View-1 can only reference an area in View-0 that is covered by the co-located macroblock and macroblocks occurring prior to the co-located macroblock. For example, the macroblock at location (2,2) in View-1 cannot reference the shaded area in View-0. In this particular example, two decoders for each view can run in parallel, with a one macroblock delay in between the decoders.

Figure 4:
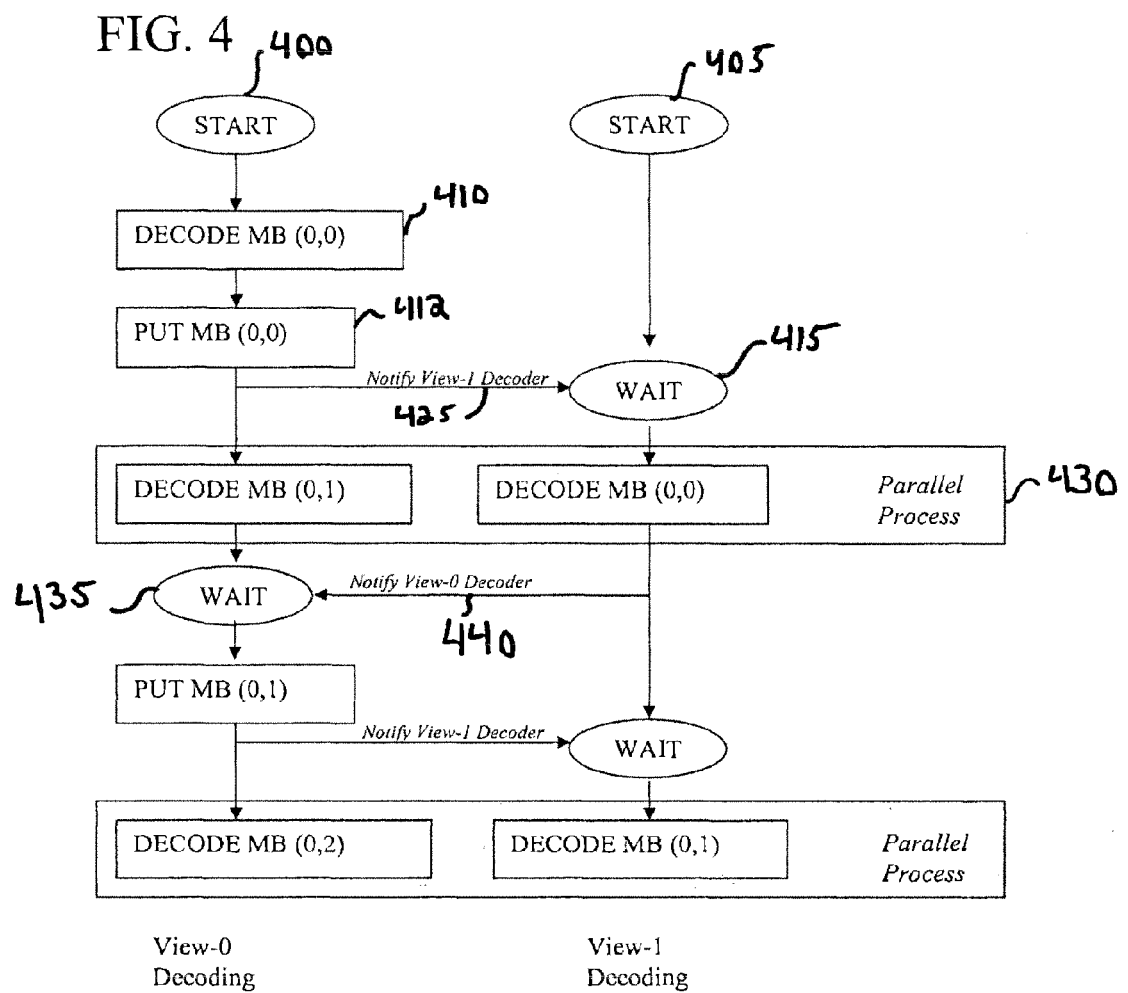
FIG. 4 is a representation showing a sample decoding process for the implementation depicted in FIG. 3.

FIG. 4 presents in detail the decoding process for the two views depicted in FIG. 3. The decoding process for the first and second views starts simultaneously, as depicted at 400 (for View-0) and 405 (for View-1). The decoding of MB(0,0) at the View-1 decoder does not start before the View-0 decoder notifies View-1 decoder that available reference area for MB(0,0) of View-1 is available in the reference memory. While the decoding of MB(0,0) of View-0 is being performed, the View-1 decoder can either enter into WAIT state (as depicted at 415), or perform a decoding operation that does not require to access the reference area, such as parsing the bitstream. Once the View-0 decoder decodes the MB(0,0) at 410 and makes the reconstructed macroblock ready in the memory at 412, the View-1 decoder is notified at 425. Once notified, the View-1 decoder can decode MB(0,0), as it does not reference any area in view-0 that is not yet available. (It should be noted that, if the MB(0,0) of View-1 is intra coded, then the decoding operation could start before the View-1 decoder receives a notification that MB(0,0) of View-0 is reconstructed and available). With this system, MB(0,1) in View-0 and MB(0,0) in View-1 could be decoded in parallel, as indicated at 430 in FIG. 4. The View-0 decoder updates the memory with the reconstruction values from MB(0,1) only after the View-1 decoder completes the decoding of MB(0,0). The View-0 decoder can either wait to be notified by the View-1 decoder, as depicted at 435, or it can continue to decode subsequent macroblocks and store the reference in a temporary buffer, without updating the reference area. The View-1 decoder's notification that the decoding process for MB(0,0) has been completed is represented at 440. This process is then repeated for the next macroblock and subsequent macroblocks as necessary.

Using the process depicted in FIG. 4, the parallel implementation of two decoders is possible. In such a parallel implementation, the total decoding time equals:

$$\tau_0+\text{delay\_overhead}+\text{synchronization\_overhead}$$

In this equation, delay_overhead is the time spent waiting for the initial macroblock(s) to be decoded. synchronization_overhead is the time spent in the WAIT states for both of the decoders. If the decoding of each macroblock at different views takes different amounts of time, then both decoders need to wait for each other quite often, resulting in a significant amount of synchronization overhead. In addition, although synchronizing between decoders may be simple for certain architectures, it could be quite problematic for certain architectures. It would therefore be advantageous to have fewer synchronization points per frame, but this could also reduce the parallelism. On another note, if the initial delay between views is large (delay_overhead is large), coding efficiency of the system would increase because of the increased area available for referencing.

In the process depicted in FIG. 4, only a one-MB delay between two views is discussed. It should be noted that it is possible to have a larger delay, although this would hinder the parallelism while, at the same time, increasing the coding efficiency, as there would be a larger reference area available for each macroblock in View-1. Thus, the macroblock delay between two views could be signaled in the bitstream rather than having it pre-defined.

In light of the design constraints discussed above, syntax elements can be defined so as to define the available reference area for each macroblock. In particular, pds_block_size and pds_initial_delay can be used to indicate a block size and initial delay, respectively. The available reference area contains reconstruction samples from a list of macroblocks that are given using the following equation:

$$(-1,j), \text{ where } j=(pds\_initial\_delay+(mbAddr/pds\_block\_size))*pds\_block\_size-1$$

A parallel decoder implementation can use pds_block_size information to decide how frequently it needs to synchronize between views. For example, the sample decoding process illustrated on FIG. 4 synchronizes two views at every macroblock, which means that pds_block_size is one. The pds_initial_delay is used by a decoder to decide how many pds_blocks (pds_block is a number of macroblocks of its size given by pds_block_size) need to be made available by the reference view before decoding can begin. For the example illustrated in FIG. 4, the pds_initial_delay is 1.

The following syntax may be used to implement one embodiment of the present invention:

| slice_layer_in_svc_mvc_extension_rbsp( ) { | C | Descriptor |
|---|---|---|
|   if(svc_mvc_flag == 1) { | | |
|     if(view_level == 0) { | | |
|       view_id | 2 | u(10) |
|       anchor_pic_flag | 2 | u(1) |
|     } else { | | |
|       slice_header( ) | | |
|     } | | |
|     if(pds_parameters_present_flag[view_id] == 1 && | | |
|   fixed_pds_for_all_sequence_flag[view_id] == 0 ) { | | |
|       pds_parameters( ); | | |
|     } | | |
|   } else { | | |
|     if ( dependency_id = = 0 && quality_level = = 0 ) { | | |
|       if ( nal_ref_idc != 0 ) { | | |
|         key_pic_flag | 2 | u(1) |
|         if ( key_pic_flag && nal_unit_type != 21 ) | | |
|           Dec_ref_pic_marking_base( ) | | |
|       } | | |
|     } else { | | |
|       slice_header_in_scalable_extension( ) | 2 | |
|       if( slice_type != PR ) | | |
|         slice_data_in_scalable_extension( ) | 2\|3\|4 | |
|       Else { | | |
|         If( fragmented_flag = = 1 ) { | | |
|           if( fragment_order = = 0 ) | | |
|             NumBytesInPRF = 0 | | |
|           while( entropy_coding_mode_flag && !byte_aligned( ) ) | | |
|             cabac_alignment_one_bit | 2 | f(1) |
|           if ( fragment_order ! = 0 ) { | | |
|             while(rbtmp_byte[ NumBytesInPRF ] = = 0x00 | | |
|               NumBytesInPRF-- | | |
|             NumBytesInPRF-- | | |
|           } | | |
|           while( more_rbsp_trailing_data( ) ) | | |
|             rbtmp_byte[ NumBytesInPRF++ ] | 2\|3\|4 | b(8) |
|           if( next_nalu_not_belongs_to_current_PRF( ) ) | | |
|             swap_buffers( rbtmp_byte, rbsp_byte ) | | |
|         } | | |
|         if ( fragmented_flag = = 0 \|\| | | |
|           next_nalu_not_belongs_to_current_PRF ( ) ) | | |
|         progressive_refinement_slice_data_in_scalable_extension( ) | 2\|3\|4 | |
|       } | | |
|       if ( fragmented_flag = = 0 \|\| | | |
|         next_nalu_not_belongs_to_current_PRF ( ) ) | | |
|       Rbsp_slice_trailing_bits( ) | 2 | |
|     } | | |
|   } | | |
| } | | |

| pds_parameters( ) { | C | Descriptor |
|---|---|---|
|   parallelly_decodable_slice_flag | | u(1) |
|   if(parallelly_decodable_slice == 1) | | |
|     For(i = 0; i <= num_multiview_refs_for_list0[view_id]; i++) { | | |
|       pds_block_size_minus1_for_list_0[i] | | |
|       pds_initial_delay_for_list_0[i] | | |
|     } | | |
|     For(i = 0; i <= num_multiview_refs_for_list1[view_id]; i++) { | | |
|       pds_block_size_minus1_for_list_1[i] | | |
|       pds_initial_delay_for_list_1[i] | | |
|     } | | |

| seq_parameter_set_mvc_extension( ) { | C | Descriptor |
|---|---|---|
|   num_views_minus_1 | | ue(v) |
|   for(i = 0; i <= num_views_minus_1; i++) { | | |
|     num_multiview_refs_for_list0[i] | | ue(v) |
|     num_multiview_refs_for_list1[i] | | ue(v) |
|     pds_parameters_present_flag[i] | | u(1) |
|     if(pds_parameters_present_flag[i] == 1) { | | |
|       fixed_pds_for_all_sequence_flag[i] | | u(1) |
|       if(fixed_pds_for_all_sequence_flag[i] == 1) { | | |
|         pds_parameters( ); | | |
|       } | | |
|     } | | |

```
        for( j = 0; j < num__multiview__refs__for__list0; j++ ) {
            anchor__reference__view__for__list__0[i][j]              u(10)
            non__anchor__reference__view__for__list__0[i][j]         u(10)
        }
        for( j = 0; j < num__multiview__refs__for__list1; j++ ) {
            anchor__reference__view__for__list__1[i][j]              u(10)
            non__anchor__reference__view__for__list__1[i][j]         u(10)
        }
    }
}
```

In this syntax, a pds_parameters_present_flag equal to 1 indicates that slices having view_id equal to i utilize pds_parameters. If a pds_parameters_present_flag equals 0, then slices belonging to view_id equal to i are not parallelly_decodable_slice. A fixed_pds_for_all_sequence_flag[i] equal to 1 indicates that all slices belonging to view_id equal to i share the same pds_parameters. The parallelly_decodable_slice_flag indicates that the interprediction is limited such that an un-deblocked reference is used for interview prediction for the current slice, and macroblocks contain only samples from the multiview reference that belong to their corresponding available_reference_area, where available_reference_area include samples only from a group of macroblocks that is defined for each of the macroblocks using the equation $$(-1, j), \text{ where } j = (pds\_initial\_delay + (mbAddr/pds\_block\_size)) * pds\_block\_size - 1$$

pds_block_size_minus1_for_list_0[i] plus 1 defines the pds_block_size, in number of macroblocks, for the multiview reference i in list-0. pds_initial_delay_for_list_0[i] defines the pds_initial_delay for the multiview reference i in list-0. pds_block_size_minus1_for_list_1[i] plus 1 defines the pds_block_size for the multiview reference i in list-1. pds_initial_delay_for_list_1[i] defines the pds_initial_delay for the multiview reference i in list-1.

Although the basic concept of how parallel decoding operation can be achieved with certain encoding constraints, it should be noted that the system of the various embodiments of the present invention affects the operation of adaptive deblocking and sub-pixel interpolation. With regard to adaptive deblocking, it is noted that in the H.264/AVC (advanced video coding) standard, an adaptive deblocking filter is utilized to remove the blocking artifacts caused by transform and quantization. The deblocking filter operates on edges across boundaries. If the boundary happens to be between two macroblocks, then decoded information from neighboring macroblocks is required to filter the edges. This filtering process has to be modified when it is used in conjunction with various embodiments of the present invention. This is due to the fact that, at the time a macroblock is made available for referencing by other views, all of its neighboring macroblocks might not have yet been decoded. In such a case, the boundaries neighboring with macroblocks which are not yet decoded cannot be filtered. There are a number of alternatives to address this issue.

A first option to address the issue of not-yet decoded macroblocks involves the use of unfiltered reconstruction for inter-view prediction. In this approach, a decoder uses the unfiltered reference when performing inter-view prediction, but regular referencing for temporal prediction. This eliminates the need for accessing neighboring macroblocks. This approach is illustrated in FIG. 3.

Figure 5:
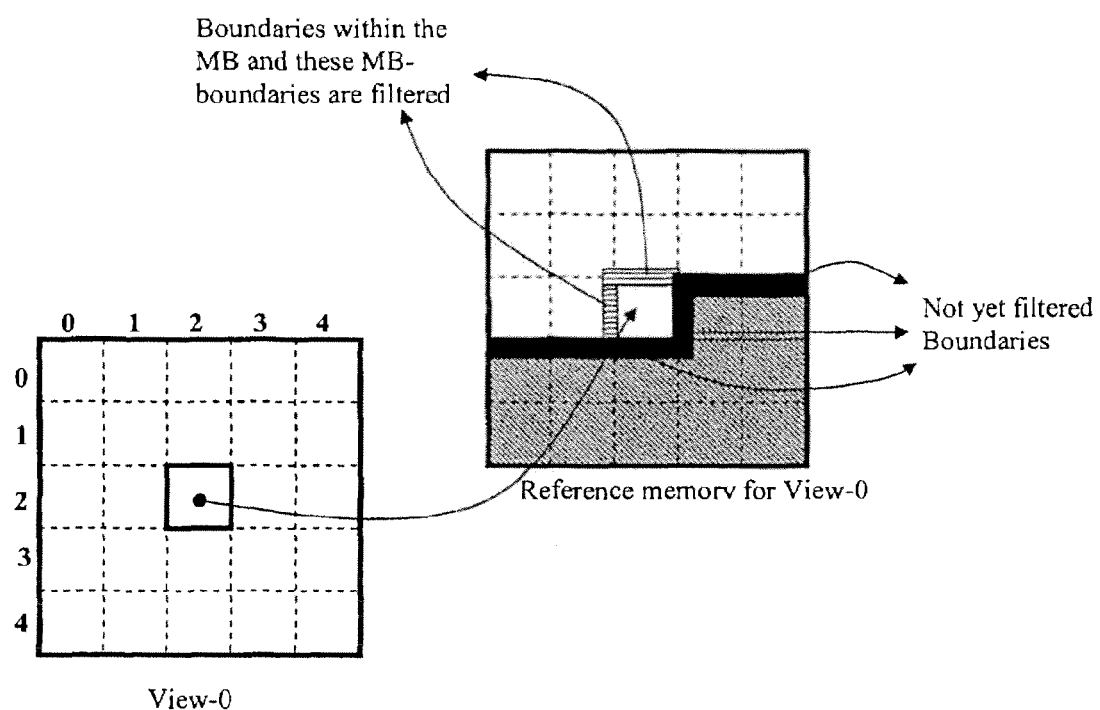
FIG. 5 is a representation of a sliding deblocking operation in accordance with a particular embodiment of the present invention.
Figure 6:
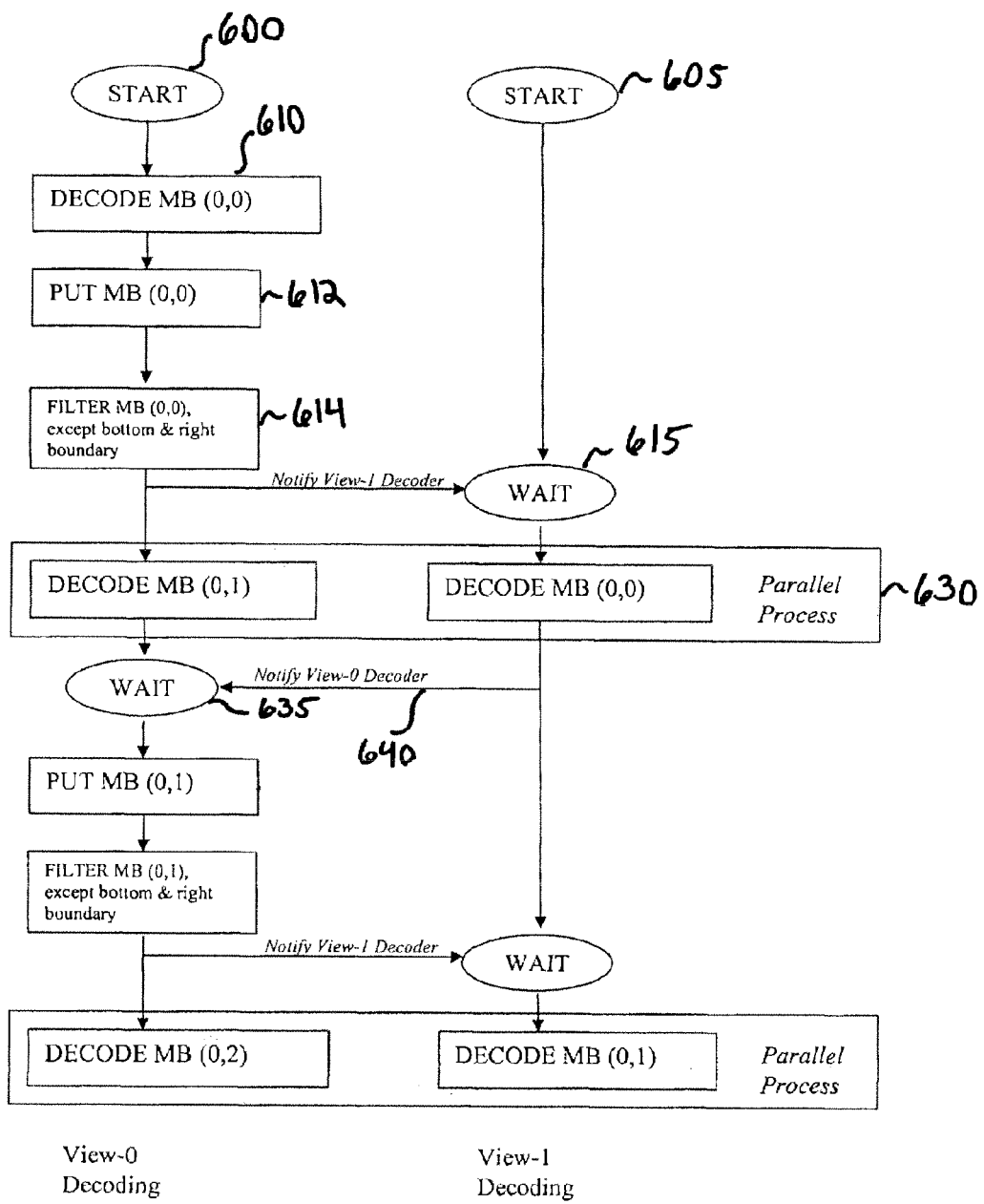
FIG. 6 is a representation showing a sample decoding process with the sliding deblocking approach depicted in FIG. 5

A second option to address around the issue of not-yet decoded macroblocks involves the use of sliding deblocking. In this approach, before the macroblock is made available as a reference for other views, all of the boundaries except for the right and bottom macroblock boundaries are filtered. This process is generally depicted in FIG. 5. FIG. 6 shows the detailed implementation of this type of decoding operation. Like the embodiment depicted in FIG. 4, the decoding process for the first and second views starts simultaneously, as depicted at 600 (for View-0) and 605 (for View-1). After starting, the View-1 decoder immediately enters a WAIT state at 615. While the View-1 decoder is in the WAIT state at 615, the View-0 decoder decodes the MB(0,0) at 610 and makes the reconstructed macroblock ready in the memory at 612. At 614, the View-0 decoder filters the entire MB(0,0) except for the bottom and right boundaries thereof. Once this is completed, the View-1 decoder is notified at 620. At 630, the View-1 decoder decodes MB(0,0), while the View-0 decoder decodes the next macroblock-MB(0,1) in this instance. Before the View-0 decoder updates the memory with the reconstruction values from MB(0,1), it waits for the View-1 decoder to complete the decoding of MB(0,0). This waiting is represented at 635, and the View-1 decoder's notification that this process has been completed is represented at 640. This process is then repeated for the next macroblock and subsequent macroblocks as necessary. In addition to the above, an encoder can utilize a modified deblocking operation where macroblock boundaries are filtered without using any decoded information from neighboring macroblocks other than reconstructed samples. This could be signaled in the bitstream to the decoder.

A third option to address the issue of not-yet decoded macroblocks involves further limiting the reference area. With this approach, the area that a macroblock can reference in another view is further limited so that none of the pixels that might change after filtering are allowed for referencing. This approach can also be used in conjunction with sliding deblocking approach discussed above.

Figure 7:
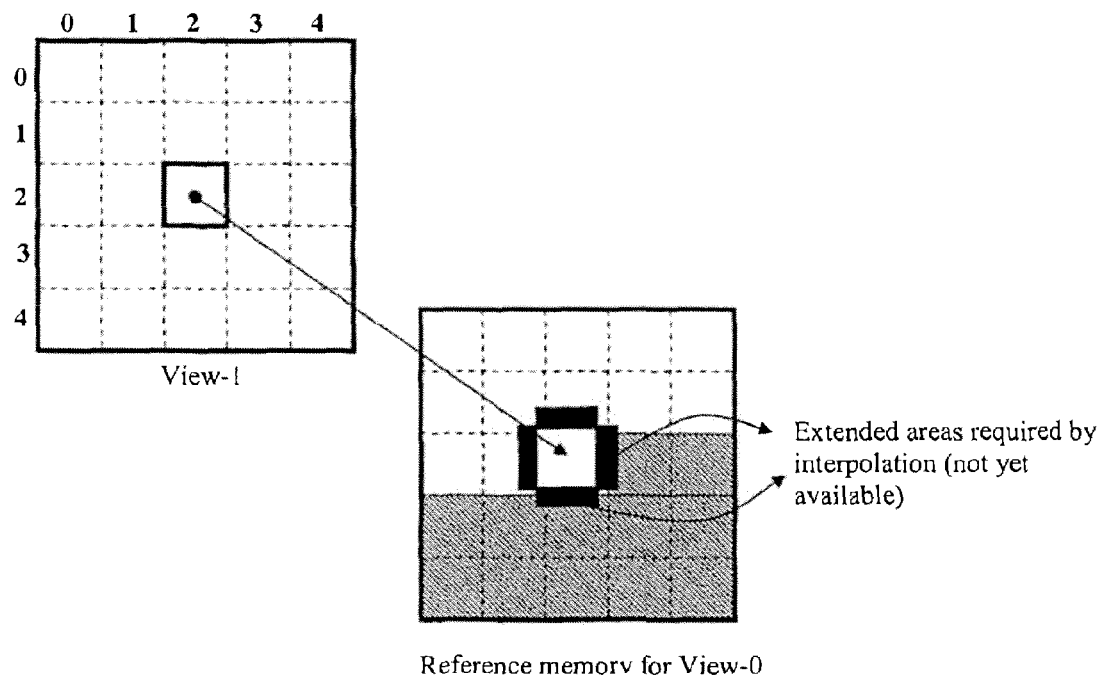
FIG. 7 is an illustration showing the effect of sub-pixel interpolation during the implementation of various embodiments of the present invention.
Figure 8:
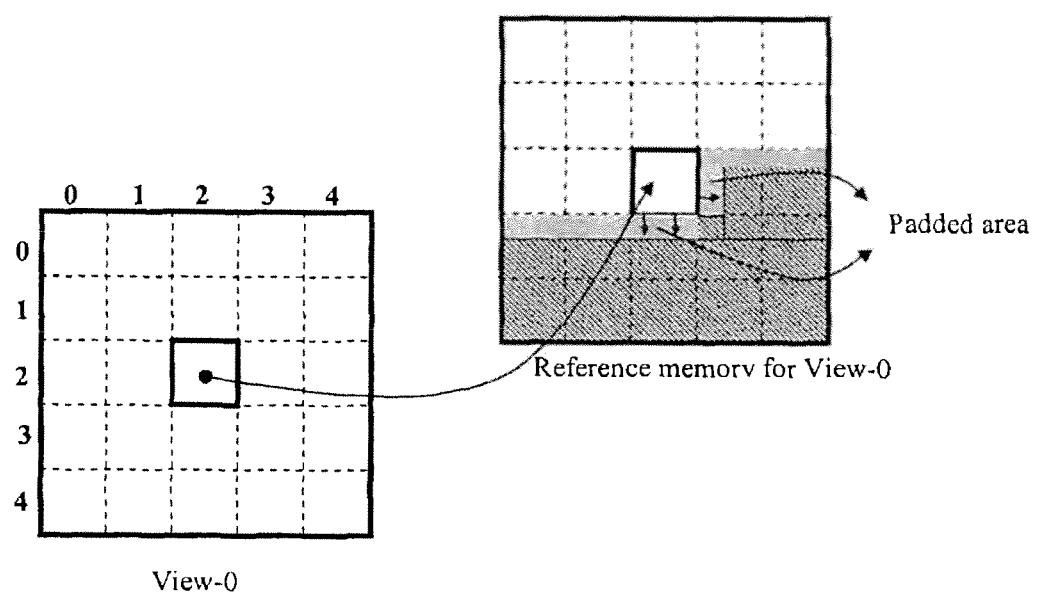
FIG. 8 is an illustration showing how padding may be used to address the sub-pixel interpolation issues depicted in FIG. 7.

Sub-pixel interpolation is performed for blocks whose motion vector has fractional pixel accuracy. In the H.264/AVC standard, motion vectors may have integer, half-pixel or quarter-pixel accuracies. The half-pixel samples are obtained by using a 6-tap FIR filter, and quarter-pixel samples are obtained by bilinear filtering using the two nearest samples at half or integer pixel positions. The effect of sub-pixel interpolation in terms of different embodiments of the present invention can be understood in view of the depiction in FIG. 3. In FIG. 3, the macroblock at location (2,2), might reference an area in View-1, where it lies within the available area (indicated as white), but still requires pixels from an unavailable area of the reference frame (indicated as shaded in the reference memory). FIG. 7 illustrates the case where the motion vector is (−0.25,−0.25) for the macroblock at location (2,2) for View-1. As seen in FIG. 7, some pixels that are required to obtain the reference are not yet available (i.e., the pixels in the shaded area). In order to solve this problem, a number of different approaches may be used. A first such approach involves padding. In this approach, after the macroblock is put into the reference memory, the bottom and right boundaries are extended by padding. The number of pixels that need to be padded depends on details of the interpolation filter, e.g., the filter length. For example, in H.264/AVC, a padding of three pixels would be needed. FIG. 8 shows the padded area in a generic scenario.

A second approach for addressing the issue of not-yet-available pixels involves further limiting the reference area. With this approach, the area that a macroblock can reference in another view is further limited for fractional pixels. As a result, none of the pixels from unavailable area are used for sub-pixel interpolation.

Figure 9:
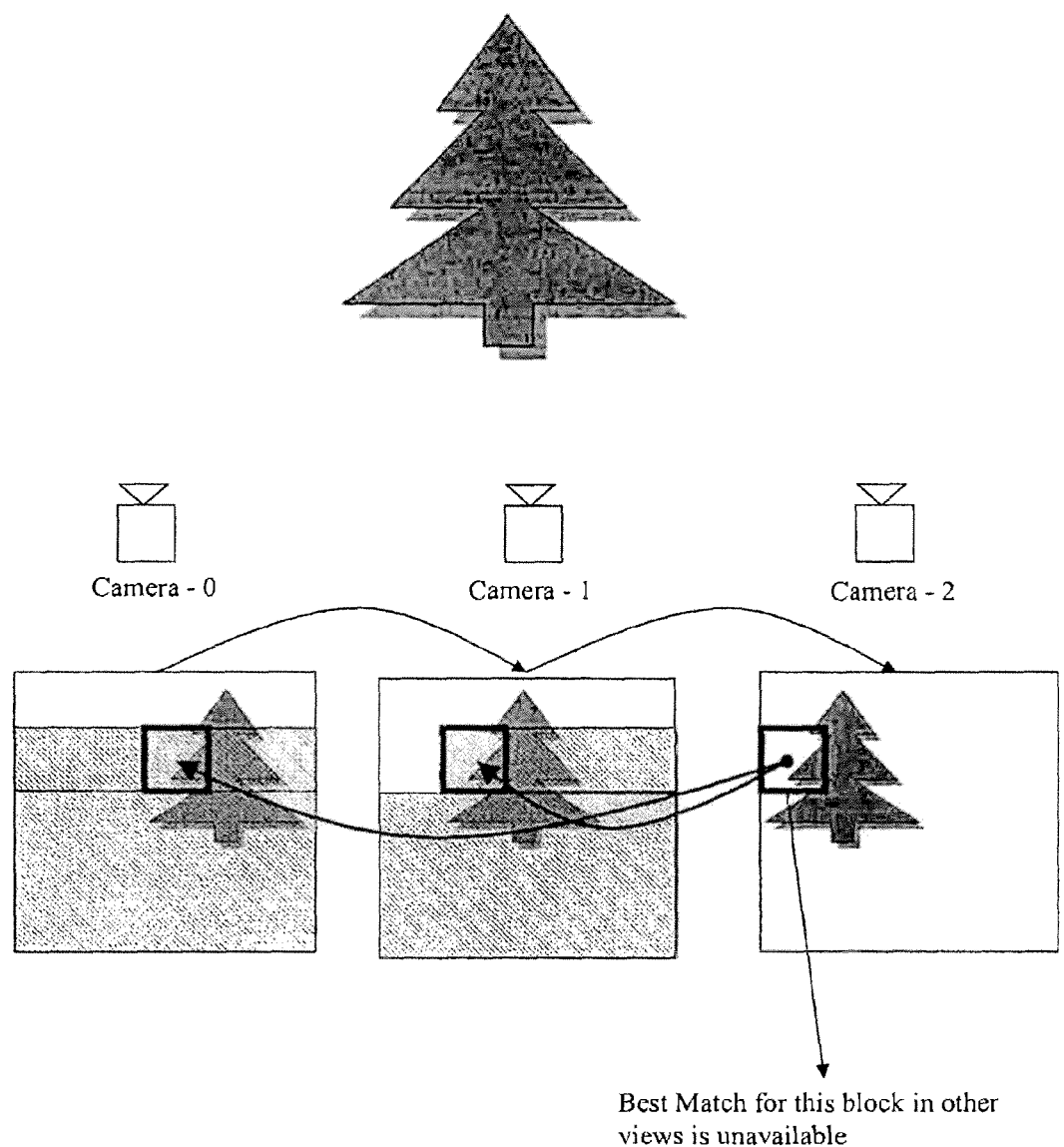
FIG. 9 is an illustration of how coding efficiency can be affected through the implementation of various embodiments of the present invention.

Because the reference area for inter-view prediction is constrained, the utilization of the various embodiments of the present invention may also result in a certain amount of degradation of coding efficiency. This penalty may become more evident in certain camera arrangements. For example, it is helpful to consider a camera system which includes three cameras that vertically aligned but horizontally spaced as illustrated in FIG. 9. Assuming that View-0 is coded as the base view, View-1 frames references View-0 frames and View-2 frames references View-1 frames, if various embodiments of the present invention are used, with a one MB delay between views, then the optimal matching blocks for View-2 and View-1 usually fall in unavailable reference areas, thereby decreasing the coding efficiency. This phenomenon can be addressed in many ways. A first approach involves arranging view dependencies. In this approach, the encoder can arrange the referencing structure between views according to the camera arrangement used to capture the views. With this arrangement, the best matching blocks in each view have a greater chance of being in the available reference area. In the example depicted in FIG. 9, reversing the order of references (i.e., with View-2 being the base view, View-1 referencing View-2 and View-0 referencing View-1) would increase the coding efficiency.

A second option for improving the coding efficiency involves modifying the original picture prior to encoding. In this approach, the encoder uses modified original pictures for certain views and signals the decoder the details of the modifications. For example, if View-2 in the aforementioned example is horizontally mirrored, blocks in View-2 would have a higher chance of finding their corresponding best matches in other views, thereby increasing the coding efficiency. It should be noted that, using this approach, different modifications would be required for different camera arrangements.

A third option for improving the coding efficiency involves the utilization of slice groups. In this approach, the frames in each view are partitioned into different slice groups according the camera arrangement. As a result, the chance of finding an optimal matching block in other views is maximized. For the example illustrated in FIG. 9, one can build slice groups that are horizontally shifted from each other with one or more macroblocks in order to improve the coding efficiency.

A fourth option for improving the coding efficiency involves utilizing a modified raster scan. With this approach, the encoding/decoding order of macroblocks is changed. For the previous example, if View-2 macroblocks start to be encoded/decoded from the top-right corner instead of the top-left corner, the chance of finding best match would increase, hence increasing coding efficiency. It should be noted that, with this approach, different scan orders would be required for different camera arrangements.

In addition to the above, signaling can also be enabled through the use of supplemental enhancement information (SEI) message syntax. The elementary unit for the output of an H.264/AVC-MVC encoder and the input of an H.264/AVC-MVC decoder is a Network Abstraction Layer (NAL) unit. For transport over packet-oriented networks or storage into structured files, NAL units are typically encapsulated into packets or similar structures. In transmission or storage environments that do not provide framing structures, a bytestream format has been specified in the H.264/AVC standard. The bytestream format separates NAL units from each other by attaching a start code in front of each NAL unit. To avoid false detection of NAL unit boundaries, encoders must run a byte-oriented start code emulation prevention algorithm, which adds an emulation prevention byte to the NAL unit payload if a start code would have otherwise occurred. In order to enable straightforward gateway operation between packet-oriented and stream-oriented systems, start code emulation prevention is always performed, regardless of whether the bytestream format is in use.

An SEI NAL unit contains one or more SEI messages, which are not required for the decoding of output pictures but assist in related processes, such as picture output timing, rendering, error detection, error concealment, and resource reservation. About 20 SEI messages are currently specified in the H.264/AVC-MVC standard. User data SEI messages enable organizations and companies to specify SEI messages for their own use. The H.264/AVC standard contains the syntax and semantics for the specified SEI messages, but no process for handling the messages in the recipient has been conventionally defined. Consequently, encoders are required to follow the H.264/AVC standard when they create SEI messages, and decoders conforming to the H.264/AV-MVC standard are not required to process SEI messages for output order conformance.

One of the reasons to include the syntax and semantics of SEI messages in H.264/AVC is to allow system specifications, such as 3GPP multimedia specifications and DVB specifications, to interpret the supplemental information identically and hence interoperate. It is intended that system specifications can require the use of particular SEI messages both in encoding and in decoding, and the process for handling SEI messages in the recipient may be specified for the application in a system specification. In light of the above, signaling of parallelly decodable slice parameters can be accomplished utilizing SEI messages. In such case, the encoder may want to disable the deblocking filter for pictures where inter-view prediction is performed.

In addition to the above, there are still other tools which may be used to increase coding efficiency. This is accomplished taking advantage of the fact that (1) motion vectors in a PDS arrangement cannot take all possible values due to the restriction of the reference area, and (2) the statistical properties of horizontal and vertical components of motion vectors are inter-related in PDS. The H.264/AVC video coding standard supports two different entropy coding arrangements—Context Adaptive Variable Length Coding (CAVLC) and Context Adaptive Binary Arithmetic Coding (CABAC). Exemplary implementations for CAVLC are provided as follows according to various embodiments, but, one skilled in the art would understand that the various embodiments are applicable to CABAC well.

In H.264/AVC, motion vectors have two components—horizontal ($MV_x$) and vertical ($MV_y$) components. Each component of a motion vector is coded separately using a prediction motion vector. In other words, a prediction is first formed, and then the difference between the prediction and the original motion vector is coded for each of the horizontal and vertical components of the motion vector. This difference is mapped to binary Exp-Golomb codewords according to their probability of occurrence, which is defined by the standard. For example, the following table presents the motion vector difference (mvd), and the associated Exp-Golomb codewords.

| Codeword | MVD |
|---|---|
| 1 | 0 |
| 010 | 0.25 |
| 011 | −0.25 |
| 00100 | 0.5 |
| 00101 | −0.5 |
| 00110 | 1.0 |
| 00111 | −1.0 |

Figure 12:
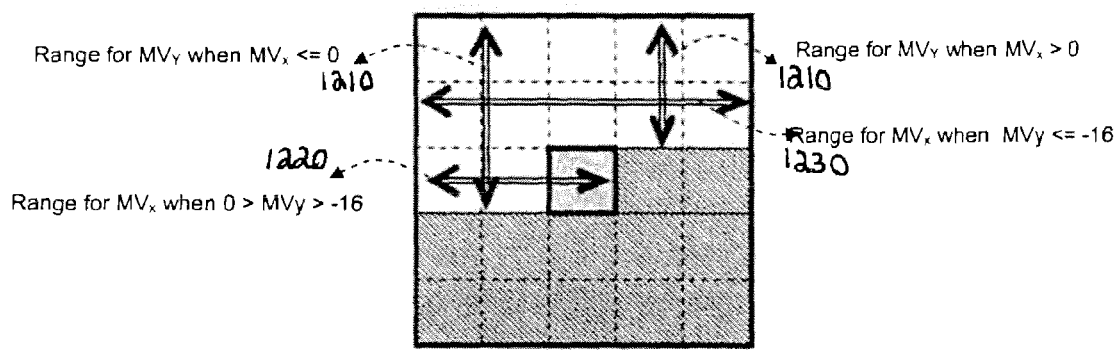
FIG. 12 is a representation of a reference area showing the ranges for horizontal and vertical components of motion vectors when the parallel decoding of views is permitted.

The arrangement presented above has two drawbacks when used with the PDS system. First, this arrangement assumes that motion vectors can point anywhere in the reference area (within the limits defined in the H.264/AVC standard). In PDS, however, the reference area is restricted. Second, the H.264/AVC standard assumes that statistical properties of horizontal and vertical components of motion vectors are independent, as they are coded separately. However, in the case of the motion vectors in the PDS system, these two components are inter-related. This point is demonstrated in FIG. 12, which shows the ranges for horizontal and vertical components of motion vectors in view of the representation in FIG. 12. In FIG. 12, it is shown how the vertical component of a motion vector has different ranges depending on the horizontal component of the motion vector. In particular, FIG. 12 shows a first vertical motion vector range 1200, a second vertical motion vector range 1210, a first horizontal motion vector range 1220 and a second horizontal motion vector range 1230. When the vertical motion vector is applied after the horizontal motion vector, the first vertical motion vector range 1200 applies when the horizontal motion vector range is less than or equal to zero, and the second vertical motion vector range 1210 applies when the horizontal motion vector range is greater than zero. Similarly, when the vertical motion vector is coded horizontal motion vector, then the first horizontal motion vector range 1220 applies when the vertical motion vector range is less than zero but greater than −16, and the second horizontal motion vector range applies when the vertical motion vector range is less than or equal to −16.

Various arrangements may be used to address the above shortcomings of the H.264/AVC standard. In a first arrangement, a single codeword can be used to code both of the components of the respective motion vector. In addition, the mapping from motion vectors to codewords may be adapted at each macroblock, depending upon the reference area. The coding of motion vectors between views (or disparity vectors) when the statistical properties of motion vectors change as the reference area is restricted. This provides an optimal coding efficiency, but also possesses a high complexity because of the updating process performed for each macroblock.

In another example, the horizontal and vertical components of motion vectors can be separately coded, while also considering the available reference area for each component when mapping the motion vector component to the binary codeword. For example, it is helpful to consider the situation where the motion vector for a designated macroblock 1250 in FIG. 12 is to be coded. In this situation, one can assume that the horizontal component of the motion vector is coded first, after which the vertical component is coded (although it may be desirable to reverse this order in certain situations). Because $MV_Y$ follows $MV_X$ in the bitstream, $MV_Y$ information cannot be utilized to code $MV_X$. For this reason, the largest range that is possible for $MV_X$ should be utilized to map $MV_X$ to the binary codeword. After $MV_X$ is coded, the range that the vertical component vector can take is known. For example, if $MV_X$ is a positive value, then $MV_Y$ can not take values between [−16, 0]. Using this range, the vertical component is mapped to the binary codeword. The mapping of motion vector components to binary codewords essentially involves removing the values that are unavailable because of the reference area constraint, and shifting the remaining possible values up in the codeword list.

The following is an example demonstrating how variable length codes may be adapted in accordance with the above embodiments in a CABAC environment. In this example, it is assumed that the following variable length codes represent a set of motion vector differences, with the following being the only candidate variable length codes:

| Candidate | Variable Length Code |
|---|---|
| A | 1 |
| B | 010 |
| C | 011 |
| D | 00100 |
| E | 00101 |
| F | 00110 |
| G | 00111 |

In this example, it is also assumed that, because of the parallel decoding restriction, the motion vector (i.e., the motion vector prediction plus the motion vector difference) can only take certain values. The prediction is known to the encoder and the decoder, so both the encoder and the decoder know what values cannot constitute the motion vector difference. If this restriction means that motion vectors A, B and C cannot be used, then the variable length codes could be altered as follows:

| Candidate | Variable Length Code |
|---|---|
| D | 1 |
| E | 010 |
| F | 0011 |
| G | 00100 |

As a result of the above change, the coding values of D, E, F and G comprise fewer bits.

Figure 10:
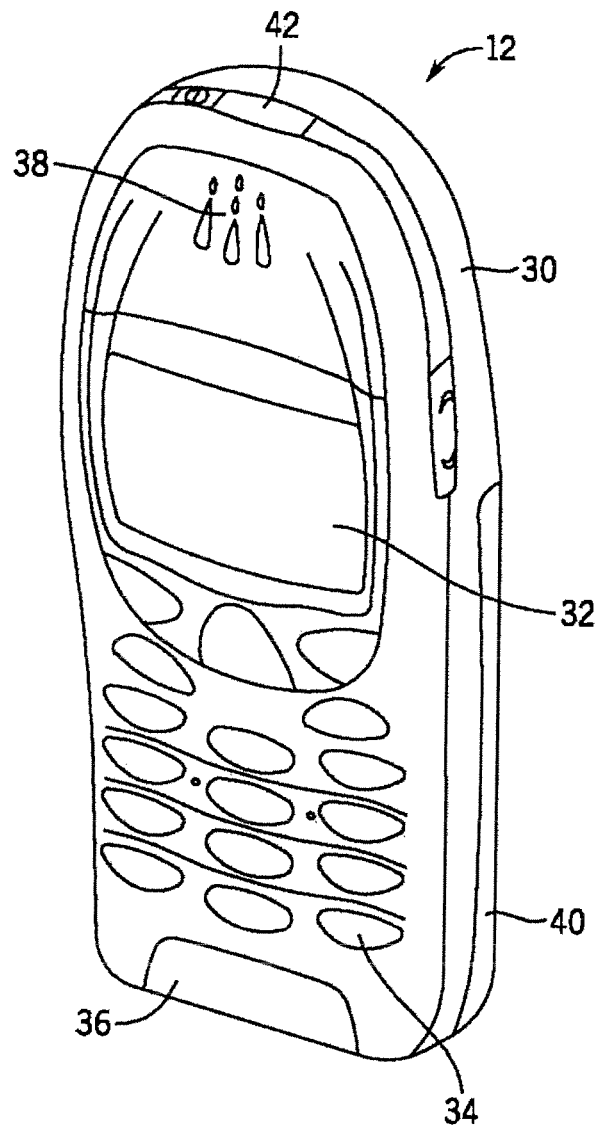
FIG. 10 is a perspective view of an electronic device that can be used in the implementation of the present invention.
Figure 11:
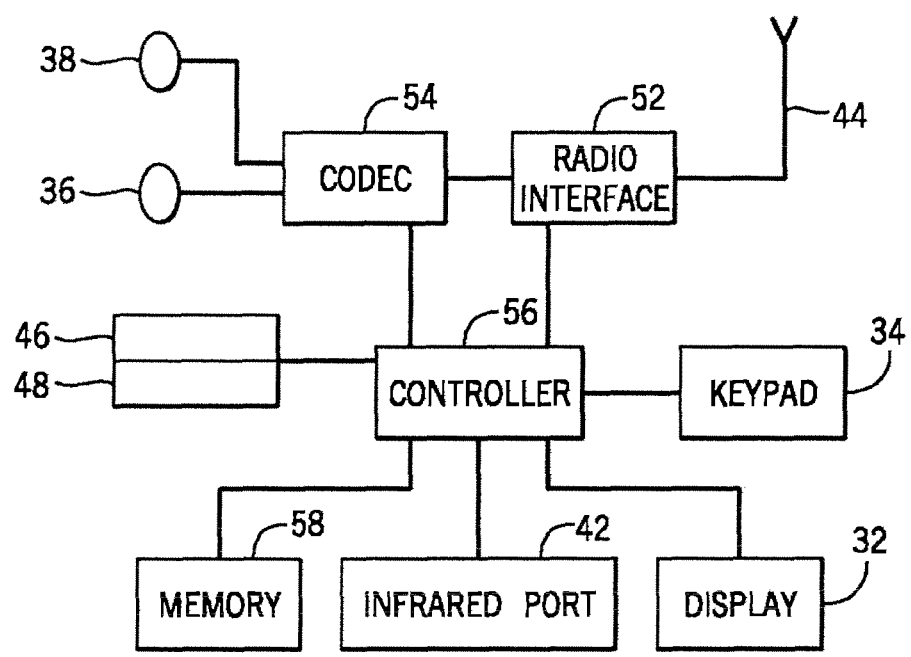
FIG. 11 is a schematic representation of the circuitry of the electronic device of FIG. 10.

FIGS. 10 and 11 show one representative electronic device 12 within which the present invention may be implemented. It should be understood, however, that the present invention is not intended to be limited to one particular type of electronic device. The electronic device 12 of FIGS. 2 and 3 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art. These various components can be incorporated into devices on virtually any of the devices discussed herein.

The present invention is described in the general context of method steps, which may be implemented in one embodiment by a program product including computer-executable instructions, such as program code, embodied on a computer-readable medium and executed by computers in networked environments. Examples of computer readable mediums can include various types of storage mediums including, but not limited to, electronic device memory units, random access memory (RAM), read only memory (ROM), compact discs (CDs), digital versatile discs (DVDs) and other internal or external storage devices. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method comprising:
receiving a particular macroblock of a first frame of a picture taken from a first view;
decoding information regarding which macroblocks in a corresponding second frame of the picture taken from a second view are permitted to be referenced by the particular macroblock, the information including a required number of macroblocks that are to be reconstructed to a reference memory before decoding of the particular macroblock is permitted to begin; and
in an instance in which the required number of macroblocks permitted to be referenced by the particular macroblock have been reconstructed to the reference memory, decoding the particular macroblock.

2. The method of claim 1, further comprising receiving a notification from a decoder that the required number of macroblocks permitted to be referenced by the particular macroblock have been reconstructed to the reference memory.

3. The method of claim 2, further comprising, after the decoding of the particular macroblock has been completed, causing the decoder to be notified.

4. The method of claim 1, wherein a decoding order of macroblocks in the first and second frames are signaled in a bitstream.

5. The method of claim 1, wherein the macroblocks in the corresponding second frame which are permitted to be referenced by the particular macroblock are based at least in part upon the arrangement of first and second cameras responsible for the first and second views.

6. The method of claim 2, wherein the required number of macroblocks that are to be reconstructed to the reference memory before decoding of the particular macroblock is permitted to begin comprises the number of macroblocks that are reconstructed to the reference memory before receiving the notification from the decoder.

7. The method of claim 1, further comprising separately encoding a horizontal and vertical component of a motion vector associated with a macroblock by mapping the horizontal and vertical components to one or more binary codewords, wherein an available reference area for the horizontal and vertical components is considered when mapping the motion vector components to the one or more binary codewords.

8. A computer program product comprising a non-transitory computer-readable medium storing program code therein, the program code being configured to, upon execution, cause an apparatus to at least:
receive a particular macroblock of a first frame of a picture taken from a first view;
decode information regarding which macroblocks in a corresponding second frame of the picture taken from a second view are permitted to be referenced by the particular macroblock, the information including a required number of macroblocks that are to be reconstructed to a reference memory before decoding of the particular macroblock is permitted to begin; and
decode the particular macroblock in an instance in which the required number of macroblocks permitted to be referenced by the particular macroblock have been reconstructed to the reference memory.

9. An apparatus, comprising a processor and a memory storing program code, the memory and program code being configured to, with the processor, cause the apparatus to at least:
receive a particular macroblock of a first frame of a picture taken from a first view;
decode information regarding which macroblocks in a corresponding second frame of the picture taken from a second view are permitted to be referenced by the particular macroblock, the information including a required number of macroblocks that are to be reconstructed to a reference memory before decoding of the particular macroblock is permitted to begin; and
decode the particular macroblock in an instance in which the required number of macroblocks permitted to be referenced by the particular macroblock have been reconstructed to the reference memory.

10. The apparatus of claim 9, wherein the apparatus is further caused to receive a notification from a decoder that the required number of macroblocks permitted to be referenced by the particular macroblock have been reconstructed to the reference memory.

11. The apparatus of claim 10, wherein the apparatus is further caused to, after the decoding of the particular macroblock has been completed, cause the decoder to be notified.

12. The apparatus of claim 9, wherein a decoding order of macroblocks in the first and second frames are signaled in a bitstream.

13. The apparatus of claim 9, wherein the macroblocks in the corresponding second frame which are permitted to be referenced by the particular macroblock are based at least in part upon the arrangement of first and second cameras responsible for the first and second views.

14. The apparatus of claim 10, wherein the required number of macroblocks that are to be reconstructed to the reference memory before decoding of the particular macroblock is permitted to begin comprises the number of macroblocks that are reconstructed to the reference memory before receiving the notification from the decoder.

15. The apparatus of claim 9, wherein the apparatus is further caused to separately encode a horizontal and vertical component of a motion vector associated with a macroblock by mapping the horizontal and vertical components to one or more binary codewords, wherein an available reference area for the horizontal and vertical components is considered when mapping the motion vector components to the one or more binary codewords.

16. A method comprising:
encoding into a bitstream a first plurality of macroblocks of a first frame of a picture taken from a first view;
encoding into a bitstream a second plurality of macroblocks of a second frame of the picture taken from a second view, at least a portion of the second frame referencing at least a portion of the first frame; and
causing to be signaled in the bitstream an indication of, for each macroblock in the second frame, which of the plurality of macroblocks in the first frame are permitted to be referenced, the indication including how many macroblocks are to be reconstructed to a reference memory before decoding of a particular macroblock is permitted to begin.

17. The method of claim 16, wherein the macroblocks in the first frame which are permitted to be referenced by a particular macroblock in the second frame is based at least in part upon the arrangement of first and second cameras responsible for the first and second views.

18. The method of claim 16, wherein the required number of macroblocks that are to be reconstructed to the reference memory before decoding of the particular macroblock is permitted to begin comprises a number of macroblocks that are to be reconstructed to the reference memory before a notification is caused to be transmitted, the notification indicating that the decoding of at least one of the second plurality of macroblocks is permitted to begin.

19. The method of claim 16, further comprising causing a decoding order of macroblocks in the first and second frames to be signaled in the bitstream.

20. The method of claim 16, further comprising separately encoding a horizontal and vertical component of a motion vector associated with a macroblock by mapping the horizontal and vertical components to one or more binary codewords, wherein an available reference area for the horizontal and vertical components is considered when mapping the motion vector components to the one or more binary codewords.

21. An apparatus, comprising a processor and a memory storing program code instructions, the memory and program code instructions being configured to, with the processor, cause the apparatus to at least:
encode into a bitstream a first plurality of macroblocks of a first frame of a picture taken from a first view;
encode into a bitstream a second plurality of macroblocks of a second frame of the picture taken from a second view, at least a portion of the second frame referencing at least a portion of the first frame; and
cause to be signaled in the bitstream an indication of, for each macroblock in the second frame, which of the plurality of macroblocks in the first frame are permitted to be referenced, the indication including how many macroblocks are to be reconstructed to a reference memory before decoding of a particular macroblock is permitted to begin.

22. The apparatus of claim 21, wherein the macroblocks in the first frame which are permitted to be referenced by a particular macroblock in the second frame is based at least in part upon the arrangement of first and second cameras responsible for the first and second views.

23. The apparatus of claim 21, wherein the required number of macroblocks that are to be reconstructed to the reference memory before decoding of the articular macroblock is permitted to be in comprises a number of macroblocks that are to be reconstructed to the reference memory before a notification is caused to be transmitted, the notification indicating that the decoding of at least one of the second plurality of macroblocks is permitted to begin.

24. The apparatus of claim 21, wherein the apparatus is further caused to cause a decoding order of macroblocks in the first and second frames to be signaled in the bitstream.

25. The apparatus of claim 21, wherein the apparatus is further caused to separately encode a horizontal and vertical component of a motion vector associated with a macroblock by mapping the horizontal and vertical components to one or more binary codewords, wherein an available reference area for the horizontal and vertical components is considered when mapping the motion vector components to the one or more binary codewords.

* * * * *

UNITED STATES PATENT AND TRADEMARK OFFICE
CERTIFICATE OF CORRECTION

| | | |
|---|---|---|
| PATENT NO. | : 8,594,203 B2 | Page 1 of 1 |
| APPLICATION NO. | : 11/872650 | |
| DATED | : November 26, 2013 | |
| INVENTOR(S) | : Ugur et al. | |

It is certified that error appears in the above-identified patent and that said Letters Patent is hereby corrected as shown below:

In the claims:

Column 18,
Line 30, "the articular macroblock" should read --the particular macroblock--;
Line 31, "to be in" should read --to begin--.

Signed and Sealed this
Twenty-fifth Day of March, 2014

Michelle K. Lee
*Deputy Director of the United States Patent and Trademark Office*